(12) United States Patent
McNelly

(10) Patent No.: US 6,336,516 B1
(45) Date of Patent: Jan. 8, 2002

(54) POWER DRIVE ATTACHMENT FOR PEDAL CYCLES

(76) Inventor: Malcolm J. McNelly, 1020 Lakeshore Blvd., Incline Village, NV (US) 89451

( * ) Notice: Subject to any disclaimer, the term of this patent is extended or adjusted under 35 U.S.C. 154(b) by 0 days.

(21) Appl. No.: 09/802,954

(22) Filed: Mar. 12, 2001

(51) Int. Cl.$^7$ .................................................. B62K 11/00
(52) U.S. Cl. .................... 180/206; 180/207; 180/220; 180/223
(58) Field of Search .................... 180/207, 206, 180/205, 223, 220

(56) References Cited

U.S. PATENT DOCUMENTS

| | | |
|---|---|---|
| 2,457,430 A | 12/1948 | Argyris |
| 2,484,472 A | 10/1949 | Simpson |
| 3,921,745 A * | 11/1975 | McCulloch et al. ........ 180/205 |
| 3,991,843 A | 11/1976 | Davidson |
| 4,044,851 A | 8/1977 | Shaw et al. |
| 4,085,814 A | 4/1978 | Davidson et al. |
| 4,122,907 A | 10/1978 | Davidson et al. |
| 4,168,758 A | 9/1979 | Holt |
| 4,871,042 A | 10/1989 | Hau et al. |
| 5,024,286 A | 6/1991 | Lean et al. |
| 5,242,028 A | 9/1993 | Murphy et al. |
| 5,316,101 A | 5/1994 | Gannon |
| 6,152,251 A * | 11/2000 | Nagai et al. ................. 180/207 |

FOREIGN PATENT DOCUMENTS

| | | |
|---|---|---|
| GB | 2249529 A | 5/1992 |
| JP | 5-50977 A | 3/1993 |

* cited by examiner

Primary Examiner—Brian L. Johnson
Assistant Examiner—Matthew Luby
(74) Attorney, Agent, or Firm—Corinne R. Gorski; Nixon Peabody LLP

(57) ABSTRACT

A power drive attachment for a pedal cycle includes a drive motor mounted on the frame of the cycle. An output drive sprocket is mounted on the motor in close vicinity to the chain ring, wherein the drive chain is captured between the drive sprocket and the chain ring. Means pivotally mount the drive motor and sprocket on the cycle frame for increasing the tension on the drive chain and for accommodating irregularities in the alignment between the drive sprocket and the drive chain. In another embodiment, a power drive attachment includes a drive motor mounted on the frame of the cycle. An output drive sprocket is mounted on the motor for engaging an unoccupied portion of the chain ring. The drive sprocket includes roller tooth means for engaging a section of the chain ring or rear sprocket which is not communicating with the drive chain, to drive the cycle.

5 Claims, 6 Drawing Sheets

POWER DRIVE ATTACHMENT FOR PEDAL CYCLES

BACKGROUND OF THE INVENTION

1. Field of the Invention

The present invention relates to an auxiliary power drive for chain driven systems, and more particularly, to a roller sprocket auxiliary drive for a pedal cycle.

2. Description of the Related Art

The increasing popularity of pedal cycles for older citizens for exercise and environmentally friendly transportation encourages the consideration of some type of power assist for a pedal cycle. Ideally, this power assist should function in conjunction with the pedal power of the cycle and should utilize the existing gearing systems of the chain drive. The power assist device should be simple to attach to, and remove from a wide number of pedal cycle configurations. Moreover, the power assist device should be lightweight, rugged and simple to operate.

Many known power assist devices are bolt-on types primarily utilizing gasoline motor packages. These devices frequently employ a friction drive bearing on the crown or sidewalls of the cycle tire. Higher efficiency mechanical drives, such as bolt on electrical drives have also been proposed.

U.S. Pat. No. 5,242,028 discloses a motorized bicycle drive system which drives the bicycle independent of the pedal drive, employing a separate drive chain. Such a device is complex and difficult to install.

Thus, there is a need for an auxiliary drive attachment which uses the existing chain drive for power delivery.

SUMMARY OF THE INVENTION

An object of the present invention is to provide a power drive attachment which bears directly on the existing chain drive of a pedal cycle and is simple to install.

Another object of the present invention is to provide a drive sprocket incorporating a free wheel hub which permits pedal power without drive motor rotation, even though the power drive unit remains engaged with the chain or chain ring.

A further object of the present invention is that the existing pedal cycle rear sprocket gear ratios can also be utilized by the power drive attachment.

Still another object of the present invention is the mounting system which is combined with a roller drive sprocket hub, which enables quick attachment and also accommodates irregularities in the alignment between the sprocket and the cycle chain ring.

By incorporating either a worm reduction gear or a bevel reduction gear in the drive, the combined advantages of orientation of the drive motor axis of rotation along the cycle frame and the ability to use a high speed drive motor are achieved in a single compact package attachable to the cycle frame and between the pedal arms or alongside the rear fork.

The present invention introduces a compact drive motor mounted adjacent the chain ring of a pedal cycle, such that the power assist drive can apply tension to the associated drive chain, and can supplement or replace pedal power through the combination of drive components.

In accomplishing these and other objectives of the present invention, in one embodiment, there is provided a power drive attachment for a pedal cycle. The cycle includes a frame, a pair of pedals, a drive chain and a chain ring mounted on the frame. The power drive attachment includes a drive motor mounted on the frame of the cycle. An output drive sprocket is mounted on the motor in close vicinity to the chain ring, wherein the drive chain is captured between the drive sprocket and the chain ring. Means pivotally mount the drive motor and sprocket on the cycle frame for increasing the tension on the drive chain and for accommodating irregularities in the alignment between the drive sprocket and the drive chain.

In a second embodiment, a power drive attachment includes a drive motor mounted on the frame of the cycle. An output drive sprocket is mounted on the motor for engaging an unoccupied portion of the chain ring. The drive sprocket includes roller tooth means for engaging a section of the chain ring or rear sprocket which is not communicating with the drive chain, to drive the cycle.

Other features and advantages of the present invention will become apparent from the following description of the invention which refers to the accompanying drawings.

DETAILED DESCRIPTION OF THE PREFERRED EMBODIMENTS

Figure 1:
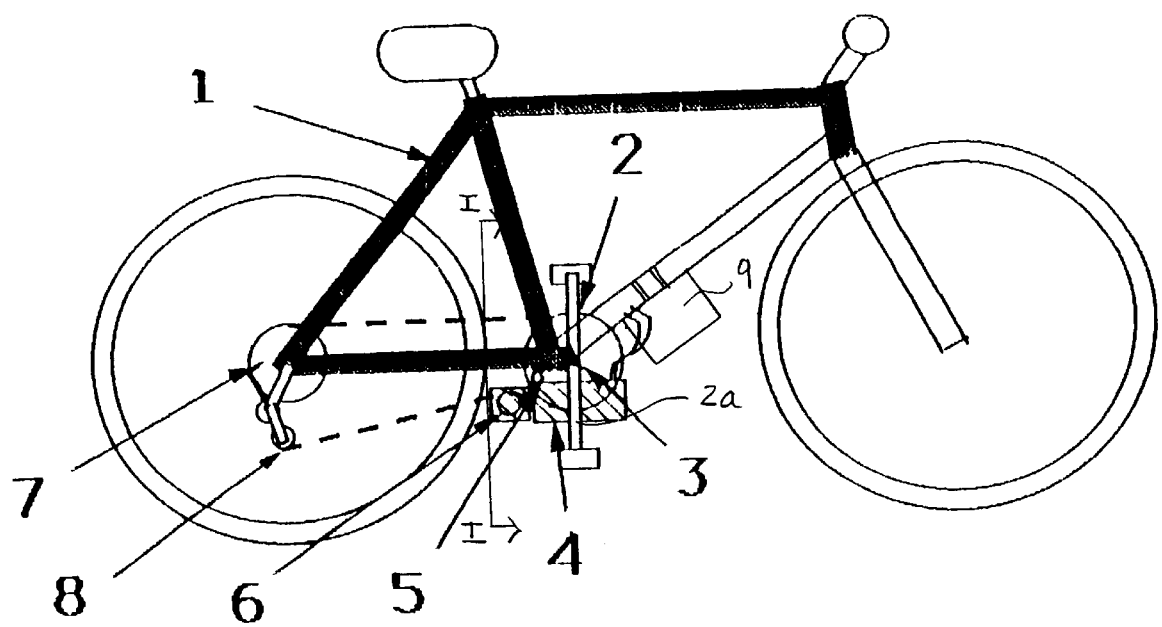
FIG. 1 is a side view of a pedal cycle incorporating a first embodiment of a power assist drive device of the present invention.

Referring to FIG. 1, in one embodiment of the present invention, a power assist device 4 is mounted from a pivot plate 5 below a bottom bracket 3 of a standard bicycle frame 1. Power assist drive 4 includes a drive sprocket 6 which bears against the drive chain 8 of a standard bicycle as it leaves a chain ring 2. The cycle also includes multiple driven gears 7 on the rear cycle wheel.

Power assist device 4 includes a motive source, such as an electric drive motor together with the appropriate attached gearing and an external electric energy supply 9, such as a storage battery, as is known in the prior art. The motor and associated drive gear, which can be either an inline gear or right angled gear (see FIGS. 5a and 5b, herein) which powers drive sprocket 6 is sufficiently compact to fit between pedal cranks 2a of a standard bicycle while maintaining adequate ground clearance.

Figure 2A:
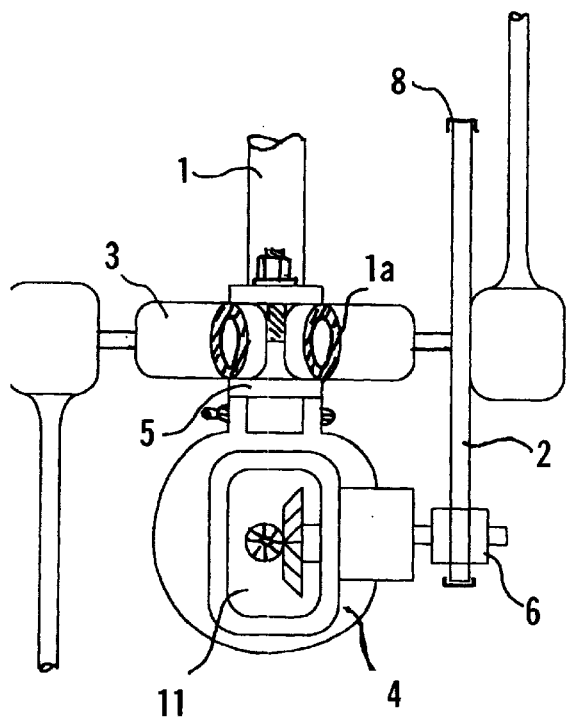
FIG. 2a is an enlarged cross-sectional view of the power assist drive device of the present invention taken along line I—I of FIG. 1 and mounted below the rear forks.
Figure 2B:
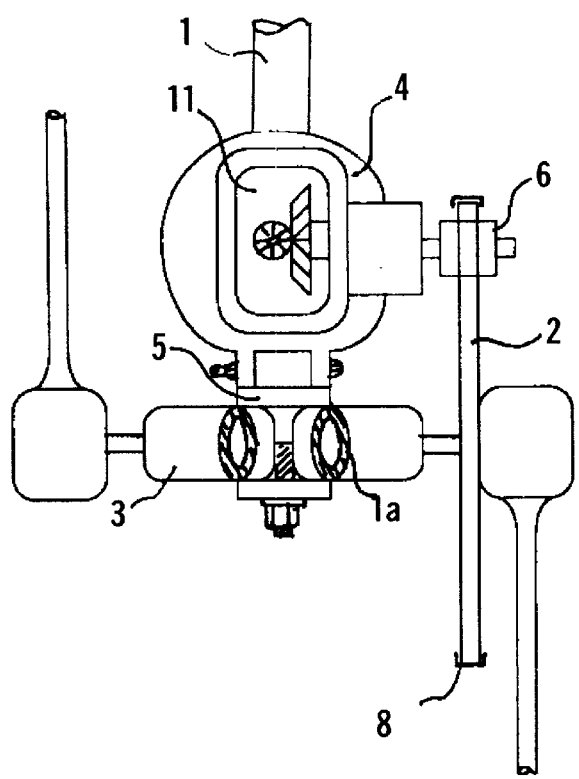
FIG. 2b illustrates mounting the power assist drive above the rear forks.

As shown in detail in FIGS. 2a and 2b, power assist is provided to the drive chain 8 through the drive sprocket 6. Drive sprocket 6 is located immediately adjacent chain ring 2, which provides the regular power source from pedal rotation. As can be seen in FIGS. 1–2b, drive chain 8 passes between drive sprocket 6 and chain ring 2. It is preferable that drive sprocket 6 bears on the non-tension or lower portion of drive chain 8, such that when providing power assist the sprocket actually further tensions the drive chain 8 as it pulls around chain ring 2. Drive sprocket 6 through its close proximity to chain ring 2 actually captures the drive chain therebetween. In this way effective drive power can be transmitted to drive chain 8 even though there is a minimal wrap of the chain around drive sprocket 6. The compact gear drive motor includes a right angle bevel drive 11, shown in FIG. 2, as well as a one way clutch. Pivoting attachment 5 is mounted to the bracket 3, which will be described further herein.

Also, by designing the drive sprocket with an internal pawl system, such as is common in the free-wheel hubs of most bicycles, the drive sprocket can be arranged to free-wheel and thus the power assist device 4 can idle when not in use, even though still engaged to the drive chain 8. Thus, the cycle can be powered by the cycle pedals, with the pawls of the wheels locked and the motor idle, or motor driven, with the pawls of the rear driven wheel and the pawl of the power assist assembly 4 being locked, and the pedals idle.

Figure 3A:
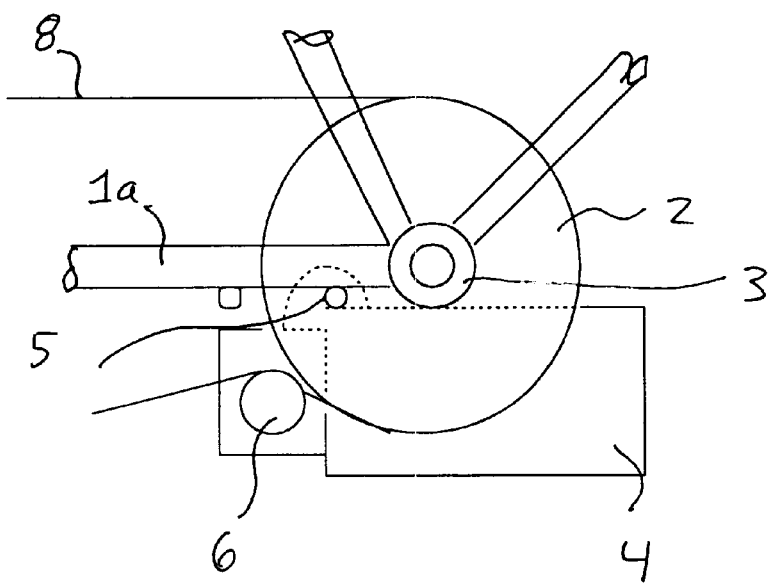
FIGS. 3a and 3b are enlarged detail views of the pivot mounting arrangement of the power assist device of the present invention.
Figure 3B:
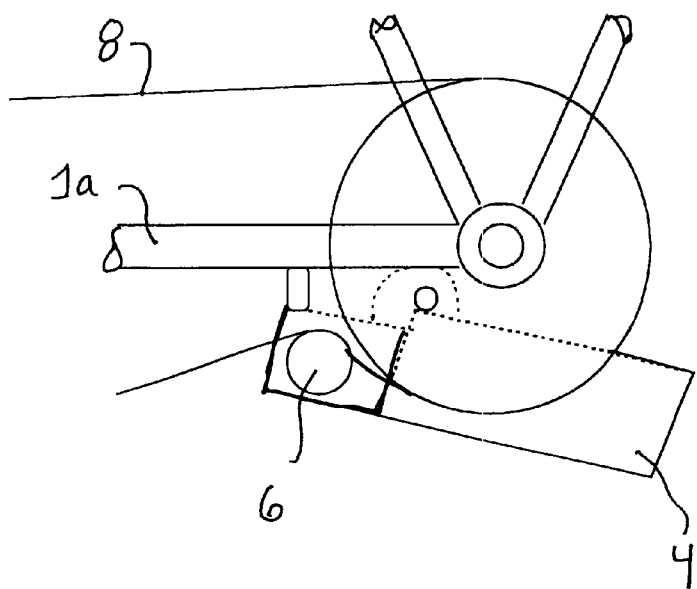

FIGS. 3A and 3B provide a further illustration of pivot mounting 5. By utilizing a pivotable mounting of power assist device 4, it is possible to further accommodate imperfections in the installation of the device, or in the chain ring. Because the mass of the device 4 hangs down forward of pivot mount plate 5, the drive sprocket 6 is thrust upward and onto the drive chain 8 with a pressure typically several times the mass of the pivoting motor 4, because the sprocket is proportionally closer to pivot 5 then the center of mass of the device 4, see FIG. 3A. The powered sprocket pulls the chain and swings motor 4. As shown in FIG. 3B, when the drive sprocket is idle and not clamping the chain, the sprocket and motor assembly 4 are pivoted downward.

Figure 4:
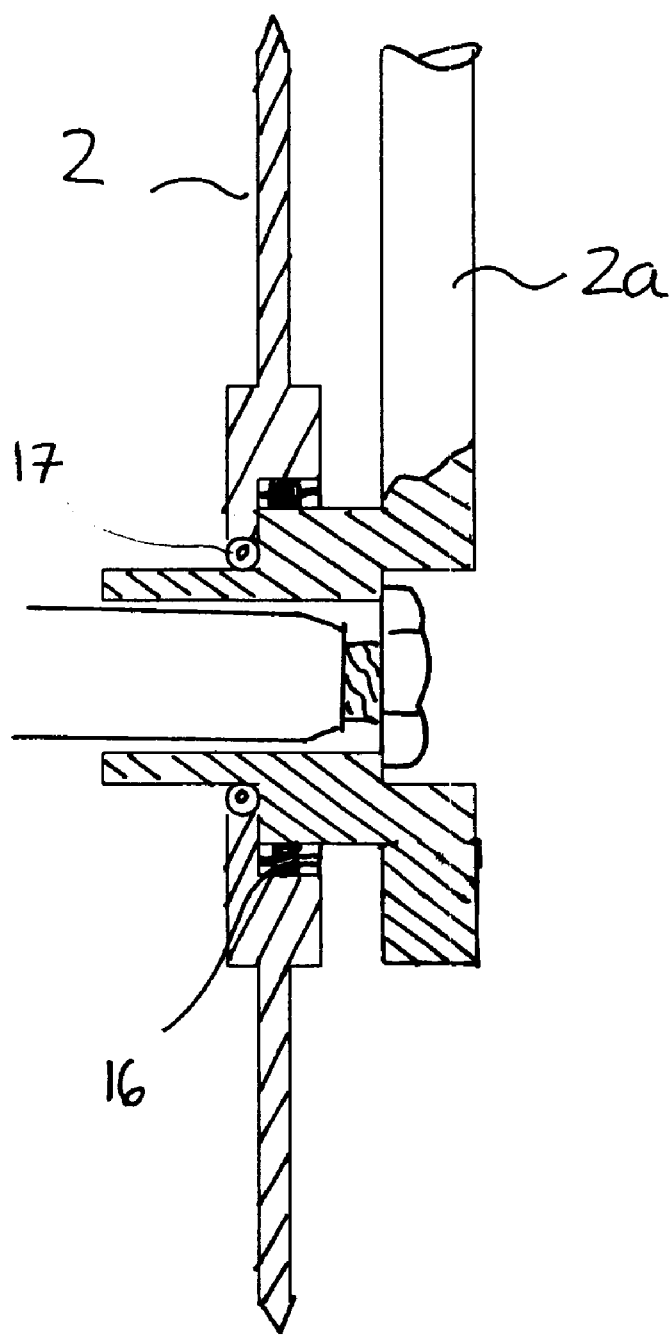
FIG. 4 is a cross-sectional view of the chain ring of the present invention including a free-wheel hub.

FIG. 4 illustrates chain ring 2 having a one way clutch. Chain ring 2 includes pawls 16 for a free-wheel hub having bearings 17 which can be incorporated permitting power assist to be applied to drive chain 8, thus rotating the chain ring while the pedal cranks remain stationary.

Figure 5A:
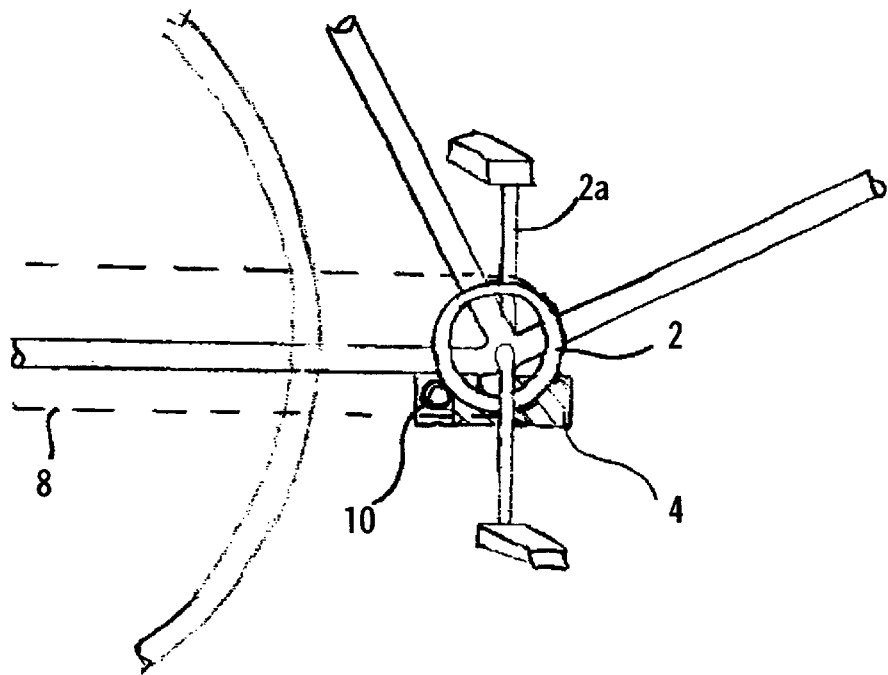
FIG. 5a is a perspective view of a roller drive sprocket of a second embodiment of the present invention, wherein the motor includes a right-angled drive.
Figure 5B:
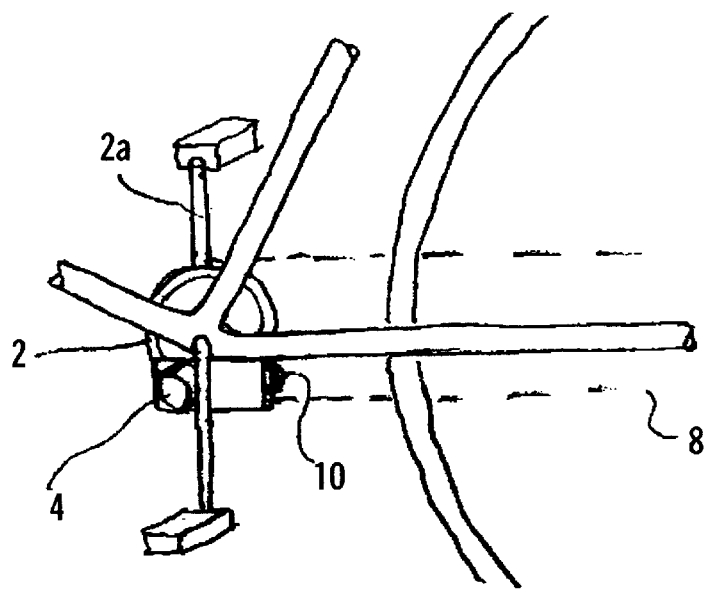
FIG. 5b is a perspective view of the roller drive sprocket having an inline drive gear.
Figure 6:
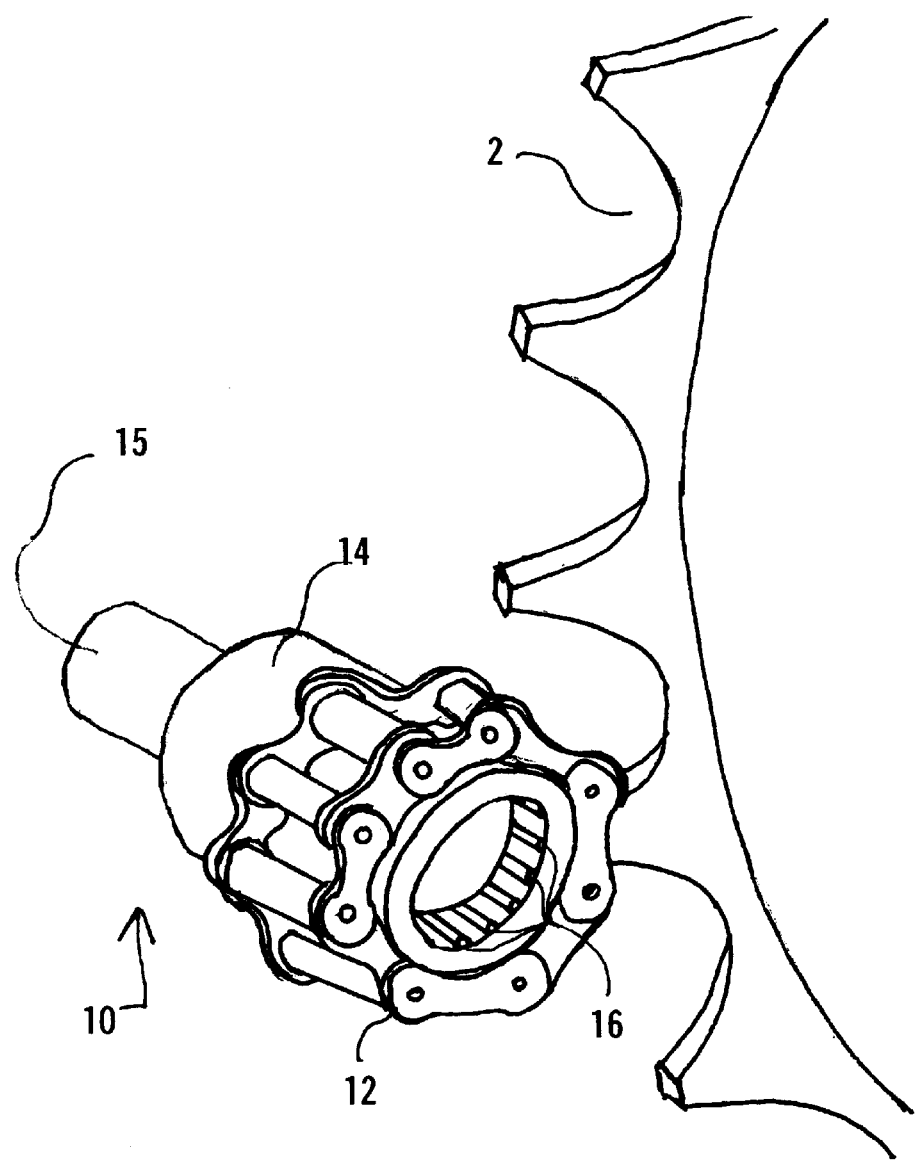
FIG. 6 is an enlarged perspective view of the roller sprocket of FIG. 5.

FIGS. 5A, 5B and 6 illustrate a second embodiment of the drive sprocket, in the form of a roller tooth sprocket 10. As shown in this embodiment, the drive chain 8 does not pass between sprocket 10 and chain ring 2. Roller sprocket 10 includes a plurality of chain links 12 coupled into a ring and press fit onto a hub 14 of the sprocket. The roller tooth sprocket is free to rotate as with a standard chain. The roller sprocket can directly engage the teeth of chain ring 2. Roller sprocket 10 directly engages an unoccupied rear sector of chain ring 2, utilizing its own rollers (chain links 12) in place of existing drive chain 8. The motor and gear box are such that the drive in inlined at an angle in FIG. 5A and inline in FIG. 5B.

As illustrated in FIG. 6, drive sprocket 10 can be a free-wheel hub incorporating caged bearings, needle clutch or pawls 16. By utilizing such a design, the drive sprocket becomes free to move laterally on its axis within the limits of the chain, becoming a chain and associated chain ring follower in the course of rotation either when delivering power or when idling. If the drive shaft 15 is somewhat longer than the needle bearing clutch forming the free wheel hub, then the assembly is free to move axially along the shaft. During operation the various needles of the clutch of sprocket 10 turn slightly, this movement bears against the drive shaft 15 moving the sprocket along shaft 15. Substantial axial misalignment, for example, at least ¼ inch, and radial misalignment, for example, at least ⅛ inch, can be accommodated from the action of the teeth engaging the chain.

Power assist device 4 becomes a more practical add-on device to existing cycles in that it can adjust alignment to accommodate deficiencies either in installation or in the perfection of the machine or frame 1 to which it is attached. The drive assembly 4 is clamped under the rear forks, 1a, see FIG. 2A. or above, see FIG. 2B. The device 4 can be slid forward into this region and roughly aligned until the drive sprocket engages the chain ring. Brief rotation of the chain ring will force adequate clearances, while the chain links prevent the sprocket from moving to far axially and becoming misaligned. The mounting plate 5 can then be clamped tight.

The present invention provides a quick attachment power device for pedal cycles and has a low center of gravity, the ability to utilize all gear ratios of the rear sprocket, a simple and rugged mounting, and the flexibility of power drive assist combined with pedal power, pedal power with no drive assist, or complete drive power.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A power drive attachment for a pedal cycle, the cycle including a frame, a pair of pedals, a drive chain and a chain wheel mounted on the frame, the power drive attachment comprising:

a drive motor mounted on the frame of the cycle;

an output drive sprocket mounted on said motor in close vicinity to the chain wheel, wherein the drive chain is captured between the drive sprocket and the chain wheel; and means for pivotally mounting the drive motor and sprocket on the cycle frame for increasing the tension on the drive chain and for accommodating axial misalignment between the drive sprocket and the drive chain.

2. The power drive attachment of claim 1, wherein the pivotal mounting means comprises a plate pivotally attached to the frame of the cycle, said drive motor being mounted on said pivot plate.

3. The power drive attachment of claim 1, wherein a hub of the drive sprocket includes clutch pawl means to allow axial movement of the drive sprocket along a drive shaft of the motor.

4. A power drive attachment for a pedal cycle, the cycle including a frame, a pair of pedals, a drive chain and a chain wheel mounted on the frame, the power drive attachment comprising:

a drive motor mounted on the frame of the cycle; and an output drive sprocket mounted on the motor, said drive sprocket including roller tooth means for engaging a section of the chain wheel which is not communicating with the drive chain, for directly engaging the chain wheel to drive the cycle,
   wherein the roller tooth means comprises a ring of interlocked chain links mounted around a hub of the drive sprocket, wherein teeth of the chain wheel engage links of the ring to be driven by the sprocket.

5. The power drive attachment of claim 4, wherein a hub of the drive sprocket includes clutch pawl means to allow axial movement of the drive sprocket along a drive shaft of the motor.

* * * * *